(12) United States Patent
Kim

(10) Patent No.: US 6,773,067 B2
(45) Date of Patent: Aug. 10, 2004

(54) RECLINING DEVICE FOR A REAR SEAT OF AN AUTOMOBILE

(75) Inventor: Seok Hwan Kim, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/329,235

(22) Filed: Dec. 23, 2002

(65) Prior Publication Data

US 2004/0026978 A1 Feb. 12, 2004

(30) Foreign Application Priority Data

Aug. 8, 2002 (KR) .............................. 10-2002-0046935

(51) Int. Cl.⁷ ................................................. B60N 2/10
(52) U.S. Cl. ................................... 297/334; 297/378.12
(58) Field of Search ........................... 297/15, 334, 336, 297/378.12; 296/65.09, 65.16

(56) References Cited

U.S. PATENT DOCUMENTS

| | | | | |
|---|---|---|---|---|
| 3,342,527 A | * | 9/1967 | Bencene | 297/378.12 |
| 3,398,987 A | * | 8/1968 | Lynn et al. | 297/378.12 |
| 3,635,525 A | * | 1/1972 | Magyar | 297/378.12 |
| 4,736,985 A | * | 4/1988 | Fourrey et al. | 297/331 |
| 5,052,748 A | * | 10/1991 | Fourrey et al. | 297/124 |
| 5,282,662 A | * | 2/1994 | Bolsworth et al. | 296/65.03 |
| 5,558,403 A | * | 9/1996 | Hammoud et al. | 297/378.12 |
| 6,000,742 A | * | 12/1999 | Schaefer et al. | 296/65.09 |
| 6,068,232 A | * | 5/2000 | Bentley | 248/503.1 |
| 6,328,381 B1 | * | 12/2001 | Smuk | 297/365 |
| 6,354,663 B1 | * | 3/2002 | Zhang et al. | 297/336 |
| 6,513,876 B1 | * | 2/2003 | Agler et al. | 297/378.14 |
| 6,601,900 B1 | * | 8/2003 | Seibold | 296/65.09 |

* cited by examiner

Primary Examiner—Peter M. Cuomo
Assistant Examiner—Stephen D'Adamo
(74) Attorney, Agent, or Firm—Morgan Lewis & Bockius LLP

(57) ABSTRACT

Disclosed is a reclining device for a rear seat of an automobile. According to the present invention, a bracket connects a seat back to a seat cushion and has a recliner connecting recess in which a control rod is inserted, and a seat back connecting recess in which a connecting rod of a seat back frame is inserted. A recliner connecting link and a seat back connecting link are installed in the bracket to selectively lock and unlock the control rod and the connecting rod. When the seat back is moved, movement of the seat cushion is restrained so that the weight of an occupant of the seat is not transferred to the reclining device. Thereby, the occupant can adjust an angle of the seat back easily.

2 Claims, 4 Drawing Sheets

RECLINING DEVICE FOR A REAR SEAT OF AN AUTOMOBILE

FIELD OF THE INVENTION

The present invention relates to an automobile seat, and more particularly to a reclining device for a rear seat of an automobile.

BACKGROUND OF THE INVENTION

Generally, a rear seat, which is mounted in a vehicle for a leisure utility or a van, has a structure in that a seat back can be folded on a seat cushion in order to ensure space for goods, which in turn can be placed to a floor surface of the vehicle or the van.

In a conventional rear seat that can be folded and dived towards the floor, the seat cushion is typically integrally combined by means of a connecting bracket with the seat back. A dive link permits the seat to be divided down to the floor. The dive link has a quarter link structure in that one end of the link is connected to an end of the seat connecting bracket while the other end connected to the floor of the vehicle or van. Also, a recliner is installed on the floor of the vehicle or van to rotatably support the seat back.

Such a conventional seat structure, since the seat back is connected by means of the connecting bracket to the seat cushion and thus the seat cushion moves along with the seat back when the seat back is reclined. That is, when the seat back is pushed back, the seat cushion also moves back.

When a passenger reclines the seat back while seated in the rear seat, the force to be applied to the recliner is much greater than a usual situation (with empty seats) because the weight of the passenger is loaded on the seat cushion. Therefore, there is a disadvantage in that the reclining of the seat back must be carried out without the weight of the passenger on the rear seat.

SUMMARY OF THE INVENTION

Embodiments of the present invention provide a reclining device for a rear seat of an automobile capable of simply adjusting an angle of the seat back by locking a seat cushion so as not to move with the back. In a preferred embodiment a bracket has a reclining connecting recess and a seat back connecting recess, respectively, formed therein for connecting the seat back to the seat cushion. A dive link connects the connecting bracket to a bottom or floor of the automobile. A recliner connecting link has a coupling recess and is rotatably installed to the connecting bracket by means of a rotating shaft. A seat back connecting link is rotatably connected to an end of the recliner connecting link by means of a rotating pin. A seat back frame has a connecting rod for supporting the seat back and a recliner has a control rod combined therewith for rotatably supporting the seat back.

In an embodiment of the present invention as described above, when the seat back is pushed backward with the connecting rod inserted into and latched by the seat back connecting recess of the bracket, the seat cushion moves along with the seat back. The control rod of the recliner is inserted into the connecting recess of the bracket to restrain the movement of the seat cushion while the connecting rod, which is positioned in the seat back connecting recess, is released from the seat back connecting recess so that the seat back can be freely moved.

Thus, a reclining device according to the present invention can recline the seat back with the passenger in the seat, without moving the seat cushion.

In a further preferred embodiment, an elbow-shaped bracket defines a first outward facing recess at the elbow and a second outward facing recess adjacent an upper end. The recliner connecting link is pivotably attached to the bracket. The recliner connecting link also defines a coupling recess at one end. A seat back connecting link is pinned to the recliner connecting link opposite the coupling recess. With this arrangement, the first bracket recess and the recliner connecting link recess cooperate with a recliner control rod, and the seat back connecting link and second bracket recess cooperate with a seat back frame rod to position the seat back. Preferably, a dive link is also pivotably connected to the bracket adjacent an end opposite the upper end and is pivotably connectable to the automobile floor.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Figure 1:
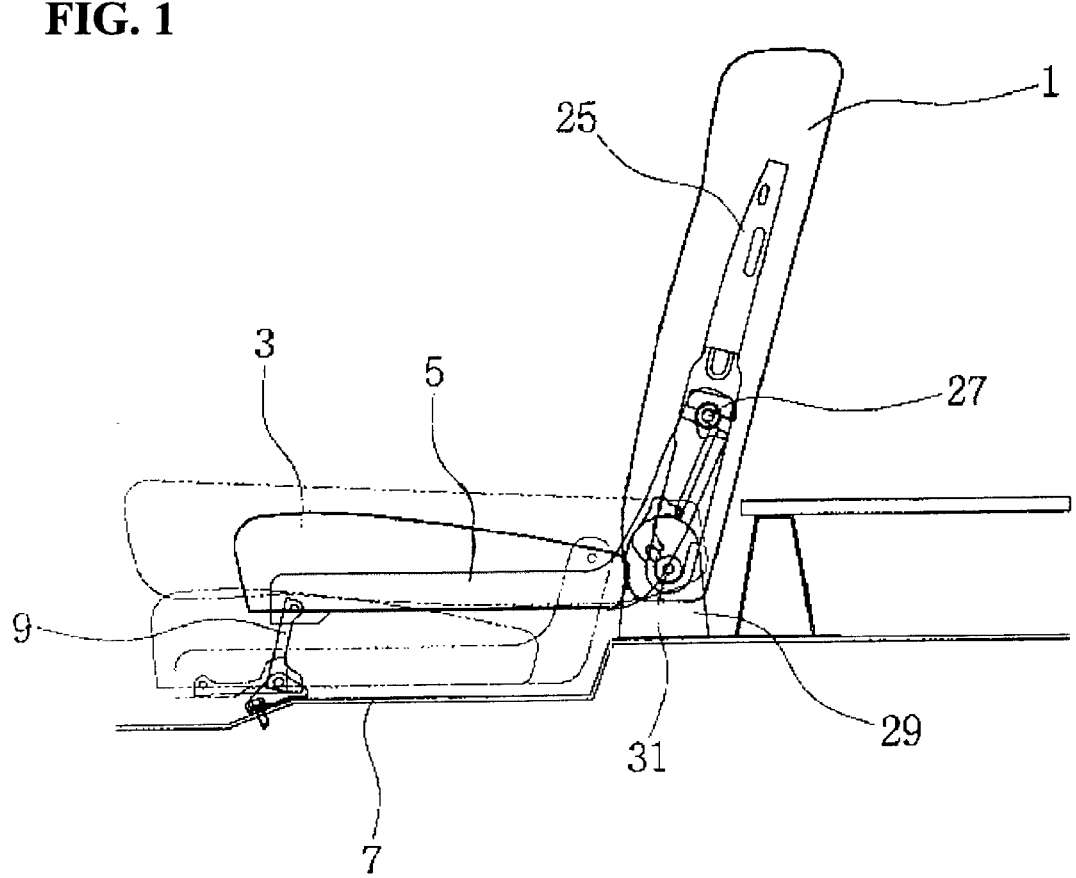
FIG. 1 is a side view schematically showing a rear seat having a reclining device installed therein according to an embodiment of the present invention.
Figure 2:
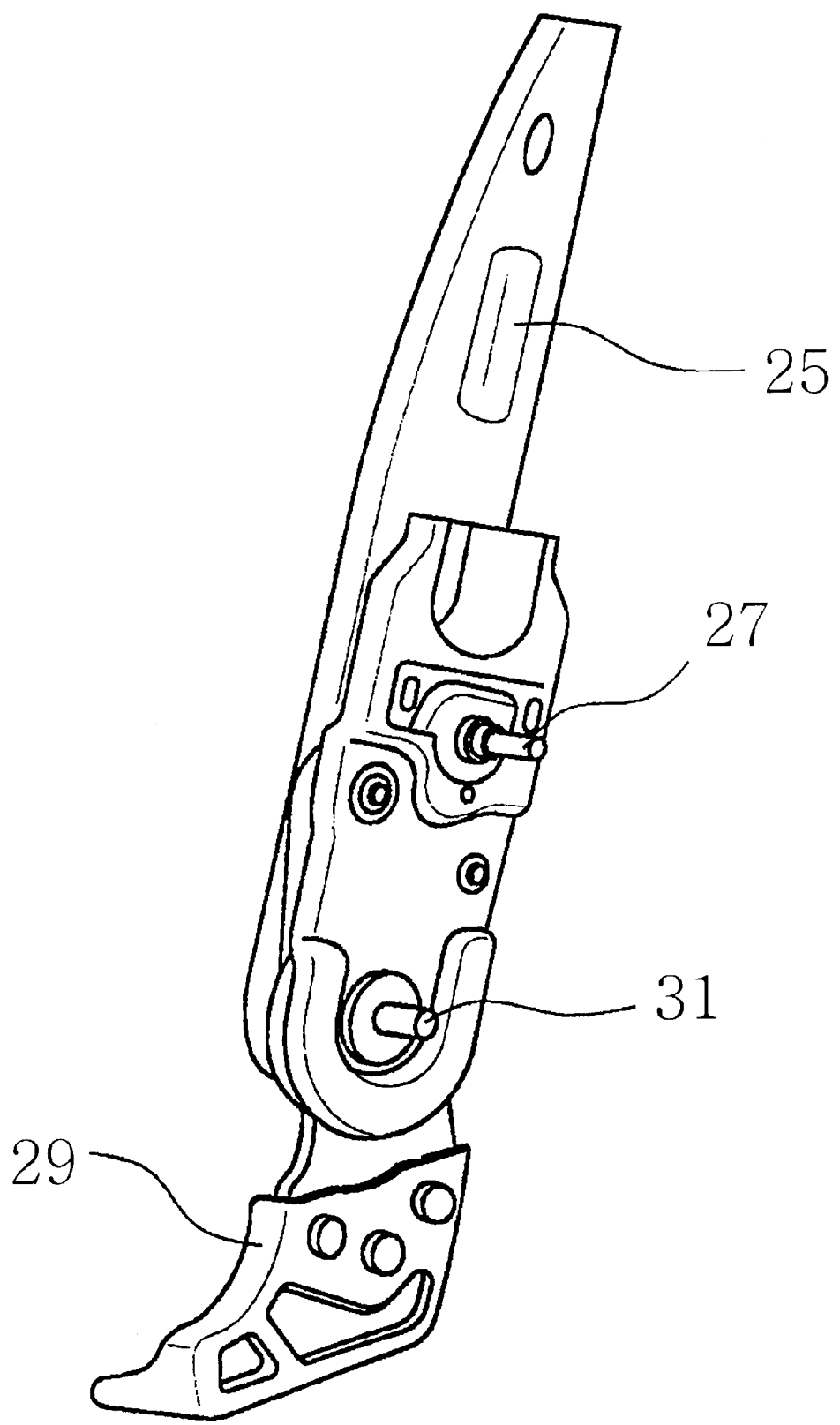
FIG. 2 is a perspective view showing a seat back frame and a recliner of the reclining device according to an embodiment of the present invention, in which a connecting rod and a control rod are shown.

Hereinafter, a preferred embodiment of the present invention will be described in detail with reference to the accompanying drawings.

Referring to FIGS. 1 to 4, a reclining device according to an embodiment of the present invention comprises a bracket 5 for connecting the seat back 1 to the seat cushion 3, which has a reclining connecting recess 11 and a seat back connecting recess 13, respectively, formed therein. A dive link 9 connects the connecting bracket 5 to the bottom or floor 7 of the automobile. A recliner connecting link 17 has a coupling recess 15 and is rotatably connected to the connecting bracket 5 by means of a rotating shaft 19. A seat back connecting link 21 is rotatably connected to an end of the recliner connecting link 17 by means of a rotating pin 23. A seat back frame 25 has a connecting rod 27 for supporting the seat back 1. Recliner 29 has a control rod 31 combined therewith, for rotatably supporting the seat back 1.

Figure 3:
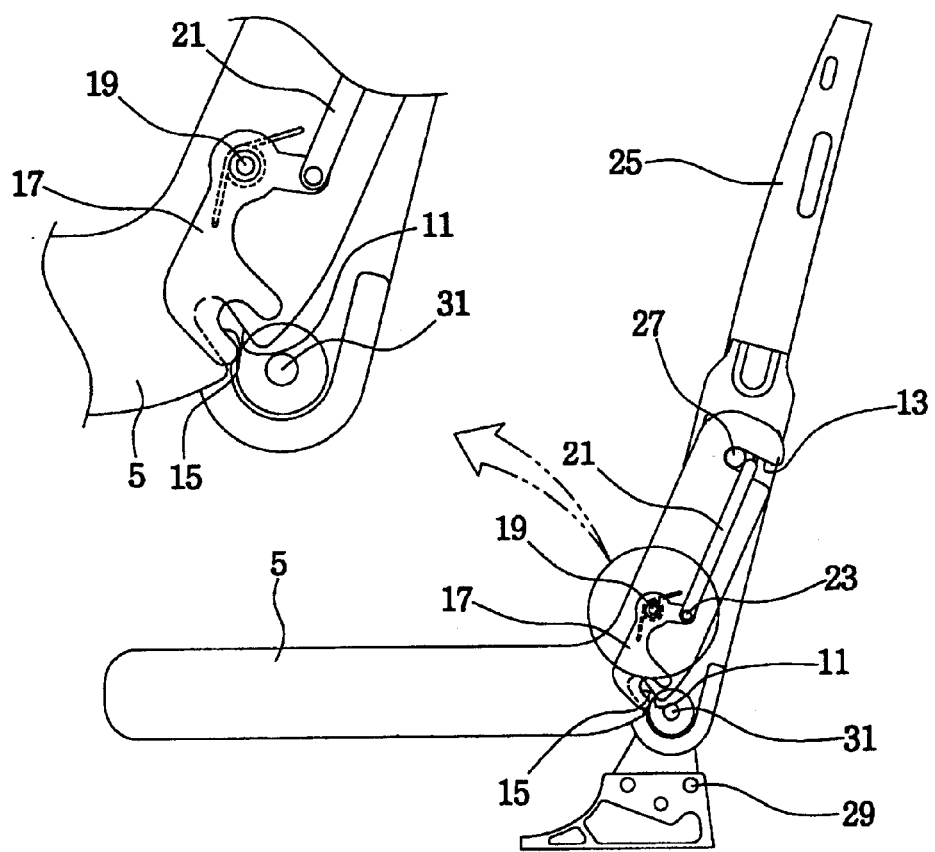
FIG. 3 is a side view showing the reclining device according to an embodiment of the present invention, in which the reclining device is latched into the seat back.

As shown in FIG. 3, the seat cushion 3 moves backward along with the seat back 1 as the seat back 1 moves backward when the connecting rod 27 is inserted in and latched in the seat back connecting recess 13 of the bracket 5, when the seat back 1 is folded on the seat cushion 3, which is pulled at the front. If the seat cushion 3 moves backwardly a predetermined distance, the control rod 31 of the recliner 29 is inserted into the recliner connecting recess 11 of the bracket 5. In this position, the control rod 31 slides into the coupling recess 15 of the connecting link 17.

Figure 4:
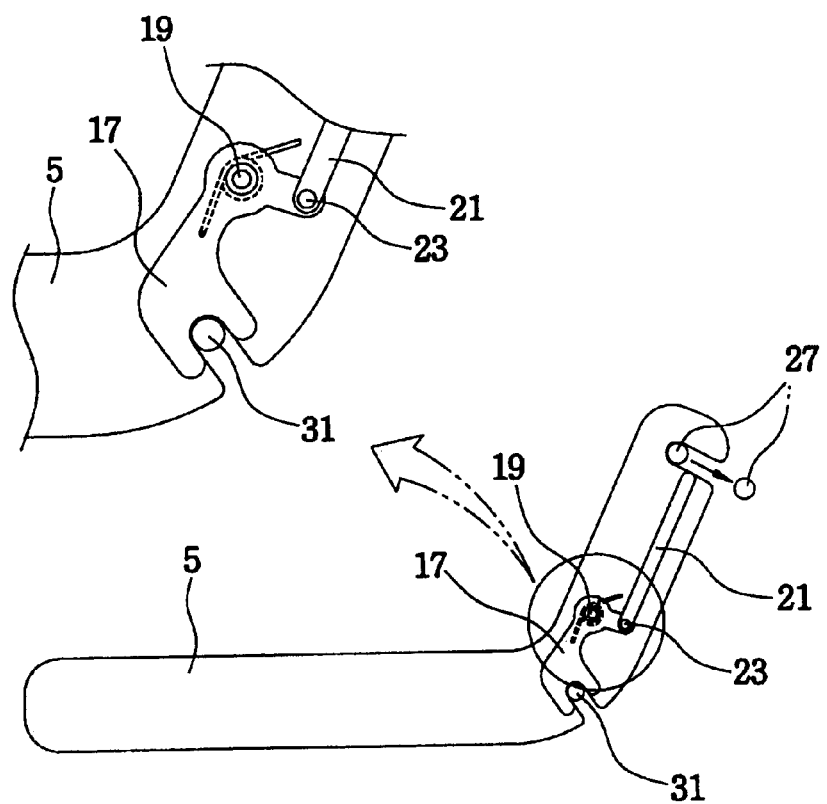
FIG. 4 is a side view showing the reclining device according to the present invention, in which the reclining device is released from the seat back.

When the control rod 31 slides into the coupling recess 15 of the connecting link 17, the connecting link 17 rotates clockwise around the rotating shaft 19 at a predetermined angle as shown in FIG. 4. The rotation force of the connecting link 17 is transferred by means of the rotating pin 23 to the seat back connecting link 21, which is downwardly pulled by means of the connecting link 17. That is, the seat back connecting link 21, which latches on the connecting rod 27 of the seat back frame 25, moves downwardly to release the locking of the connecting rod 27.

As shown in FIG. 3, the seat back frame 25 and the recliner 29 rotate around the control rod 31 in the opposing direction. As described above, therefore, when the control rod 31 of the recliner 29 is latched in the connecting recess 11 of the bracket 5 and the connecting rod 27 of the seat back frame 25 is released from the seat back connecting recess 13, the seat cushion 3 is latched by means of the control rod 31 so as not to move backward and the seat back 1 connected to the seat back frame 25 can rotate around the control rod 31 at an angle (see FIG. 4).

A recovering spring 33 is mounted on the rotating shaft 19 of the connecting link 17 so that the control rod 31 of the recliner 29 is released from the connecting recess 11 of the bracket 5 to make the connecting link 17 rotate counterclockwise by means of the spring when the seat back is returned to an initial position. When the seat back is returned to the initial position, therefore, the connecting rod 27 of the seat back frame 25 is inserted into the seat back connecting recess 13, and then the connecting link 17 is counterclockwise rotated around the rotating shaft 19 by means of the resilient force of the spring to push the seat back connecting pin 21 upwardly so that the connecting rod 27 of the seat back frame 25 is automatically locked in the seat back connecting recess 13.

In the rear seat having the reclining device according to embodiments of the present invention, as described above, when the passenger adjusts the angle of the seat back while sitting without any other operation, the movement of the seat cushion is restrained and only the seat back moves, resulting in adjusting the angle of the seat back.

In the rear seat having the reclining device according to the present invention, accordingly, the bracket connecting the seat back and the seat cushion has the recliner connecting recess in which the control rod of the recliner is inserted and the connecting recess in which the connecting rod of the seat back frame is inserted. The recliner connecting link and the seat back connecting link are installed in the bracket to restrain and allow the movement of the control rod and the connecting rod. Thereby, when the seat back is moved, the movement of the seat cushion can be restrained so that the passenger adjusts the angle of the seat back as the weight of the passenger cannot be transferred to the seat cushion.

While the preferred embodiments of the present invention have been described, it is understood that the present invention should not be limited to these preferred embodiments but various changes and modifications can be made by one skilled in the art within the spirit and scope of the present invention as claimed.

What is claimed is:

1. A reclining device for an automobile seat, comprising:
   an elbow-shaped bracket defining a first outward facing recess at the elbow and a second outward facing recess adjacent an upper end;
   a recliner connecting link pivotably attached to said bracket, the recliner connecting link defining a coupling recess at one end; and
   a seat back connecting link pinned to the recliner connecting link opposite said coupling recess;
   wherein said first bracket recess and said recliner connecting link recess cooperate with a recliner control rod and said seat back connecting link and second bracket recess cooperate with a seat back frame control rod to position the seat back.

2. A reclining device as in claim 1, further comprising a dive link pivotably connected to the bracket adjacent an end opposite the upper end and pivotably connectable to the automobile floor.

* * * * *